April 23, 1946.  C. H. HORN  2,398,939
SALT AND SUGAR OVEN
Filed Feb. 5, 1945  2 Sheets-Sheet 1
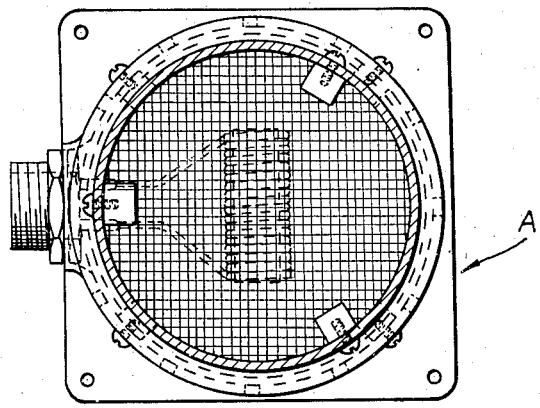
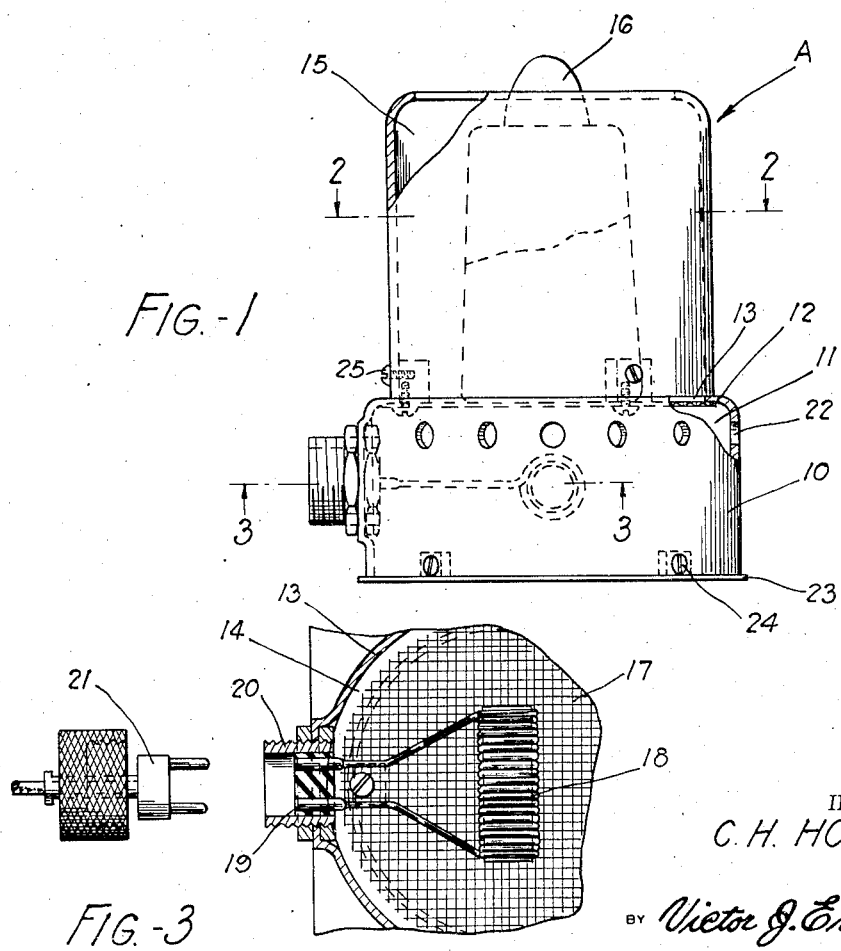
INVENTOR.
C. H. HORN
BY Victor J. Evans & Co.
ATTORNEYS April 23, 1946.  C. H. HORN  2,398,939
SALT AND SUGAR OVEN
Filed Feb. 5, 1945  2 Sheets-Sheet 2
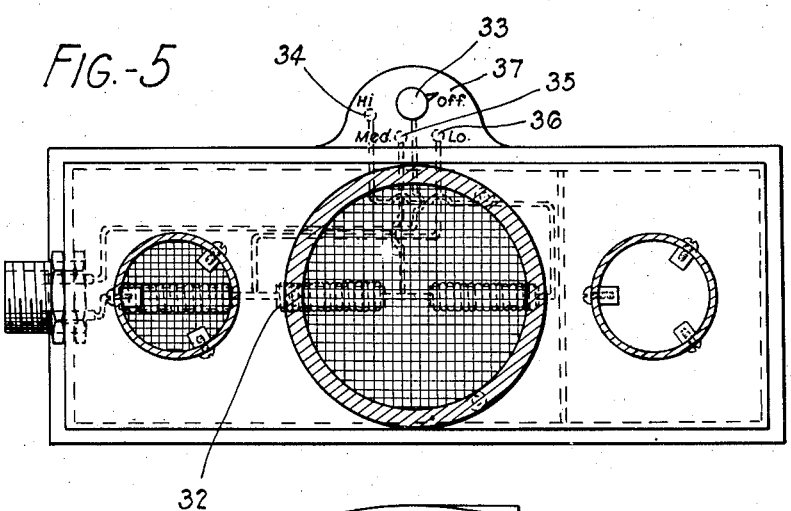
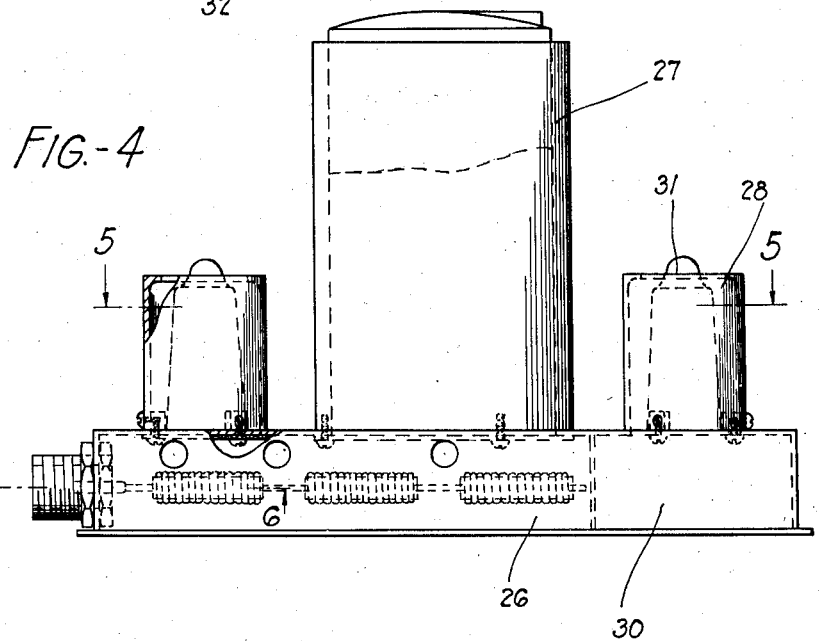
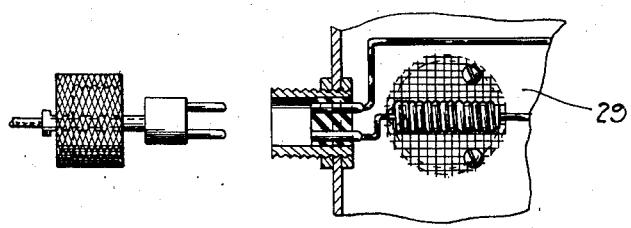
INVENTOR.
C. H. HORN Patented Apr. 23, 1946

2,398,939

UNITED STATES PATENT OFFICE 2,398,939

SALT AND SUGAR OVEN

Clyde H. Horn, St. Simon Island, Ga.

Application February 5, 1945, Serial No. 576,269

1 Claim. (Cl. 219—19)

The invention relates to an electric heater, and more especially to a portable electric stand heater.

The primary object of the invention is the provision of a heating device of this character, wherein a salt shaker and a sugar bowl or other like holders can be conveniently held, so that the contents can be dried, to relieve moisture therefrom acquired through surrounding humidity or otherwise.

Another object of the invention is the provision of a device of this character, wherein the heat therefrom can be varied at the will of the user of such device, the latter being a table appliance, and serves to concentrate the heat at the lowermost portion of each container placed therein for the quick drying of its contents, and such containers held are readily removable from the device for dispensing of their contents.

A further object of the invention is the provision of a device of this character, wherein the heating elements are arranged in association with an electric circuit controlling switch, which is hand adjusted, for regulating high, medium and low degrees of heat, in the operation of the said device, for the purposes hereinbefore stated.

A still further object of the invention is the provision of a device of this character, which is simple in construction, thoroughly reliable and efficient in operation, strong, durable, readily and easily handled, portable, neat in appearance, novel and unique in its construction and assembly, and inexpensive to manufacture.

With these and other objects in view, the invention consists in the features of construction, combination and arrangement of parts as will be hereinafter more fully described, illustrated in the accompanying drawings, which disclose the prefererd and modified forms of construction thereof, and pointed out in the claim hereunto appended.

In the accompanying drawings—

Figure 1 is a side elevation of one form of the device constructed in accordance with the invention.

Figure 2 is a sectional view taken on the line 2—2 of Figure 1 looking in the direction of the arrows.

Figure 3 is an exploded fragmentary partial sectional view taken approximately on the line 3—3 of Figure 1, showing the electric extension cord plug piece detached.

Figure 4 is a side elevation of a modified form of the device constructed in accordance with the invention.

Figure 5 is a sectional view taken approximately on the line 5—5 of Figure 4 looking in the direction of the arrows.

Figure 6 is a view similar to Figure 3 taken approximately on the line 6—6 of Figure 4 looking in the direction of the arrows.

Similar reference characters indicate corresponding parts throughout the several views in the drawings.

Referring to the drawings in detail, particularly Figures 1 to 4, inclusive, which disclose one form of the invention, A designates generally the heater constructed in accordance with the invention, and comprises an inverted substantially cup-shaped or cylindrical supporting base constituting a bottom section 10, forming an internal heating chamber 11, opening through the top thereof, and this open top is surrounded by an inturned rim flange 12, concentrically thereof.

The flange 12 has rising therefrom a cylindrical top section constituting a housing 13 provided with a top entrance 14, for access to an internal well 15, within such housing.

The well 15 removably receives a container, or the like, for holding salt, sugar or other commodity, which becomes moist through climatic conditions, a salt shaker 16 being schematically indicated, as seen in Figure 1 of the drawings, for an example of a container held in the device A for the heating of the contents of such container thereby.

Arranged at the juncture of the sections 10 and 13 is a wire mesh or reticulated shelf 17 upon which the container rests for the heating thereof when within the well 15. Within the chamber 11 in the bottom section 10 is an electric heating coil or unit 18, which has its electric contacts 19 counterseated in a socketed coupling sleeve 20 for the detachable connection therewith of an electric extension cord plug connector 21 delivering current to the unit or coil 18, the sleeve 20 being anchored to the bottom section 10, as best seen in Figure 3 of the drawings.

The side wall of the bottom section 10 is provided with air holes or ports 22, which may be of any required number, and selectively spaced from each other in a row circumferentially of the said section 10.

The section 10 has a detachable bottom closure 23, which is detachably connected at 24, the sections 10 and 13, being detachably united at 25 to each other.

When the heating unit 18 is active, the heat therefrom flows upwardly through the shelf 17 for the warming of the container from the bottom thereof, when at rest on the said shelf.

In Figures 4 to 6 inclusive of the drawings, there is shown a modified form of the invention, wherein the bottom section 26 is of elongated or rectangular shape and has rising from its top spaced intermediate large and outer small container holding housings 27 and 28, respectively, one of the housings 28 being blocked off from the heating chamber 29 within the bottom section 26 by a partition 30, and this particular housing a pepper shaker, identified at 31, in Figure 4, which does not require heating. The housings 27 and 28 are open at their top, giving access to the wells created therein for the placement of containers within the same.

Within the chamber 29 for association with the housing 27 and the other housing 28 is a series of resistance coils or heating units 32, the electric current supply thereto being controlled by a three-point contact hand operated switch 33, for regulating high, medium or low heating operation of the device, the current supply being also cut off by this switch 33, and the contacts for the latter are indicated at 34, 35 and 36 respectively while the cut off position is at 37, best seen in Figure 5 of the drawings.

The large housing 27 is for holding a sugar bowl or other like container, while the heated housing 28 is for holding a salt shaker, the modified form of the device is susceptible of three degrees of heating operation, as before indicated. The housings serve as heating ovens for the purposes stated, in the working of the device.

It is, of course, understood that proper insulation is provided for the electric assembly in the device, and the detail construction thereof has not been gone into, for the sake of brevity in the descriptive matter of the invention, as it is of no essential value thereof.

What is claimed is:

A device of the kind described, comprising a bottom section forming a heating chamber, openings in the top of said bottom section, inturned flanges surrounding said openings, top sections rising from and seated on the inturned flange of the bottom section for communication with the latter and forming heat ovens accessible through the tops thereof, means for securing said bottom section to said top section, a supporting screen at the point of communication of the sections with each other, electric heating means confined within the heating chamber, electric current supply detachably connected to the heating means and means included with the heating means for regulating the heating operation thereof.

CLYDE H. HORN.